(12) United States Patent
Fraenkel-Saban et al.

(10) Patent No.: US 12,430,304 B2
(45) Date of Patent: Sep. 30, 2025

(54) COORDINATING DEDUPLICATION AMONG NODES

(71) Applicant: Dell Products L.P., Round Rock, TX (US)

(72) Inventors: Rachel Fraenkel-Saban, Yeruham (IL); Uri Shabi, Tel Mond (IL); Boaz Sela, Lehavim (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/406,350

(22) Filed: Jan. 8, 2024

(65) Prior Publication Data
US 2025/0225112 A1   Jul. 10, 2025

(51) Int. Cl.
*G06F 16/00*  (2019.01)
*G06F 16/215* (2019.01)
*G06F 3/06*   (2006.01)

(52) U.S. Cl.
CPC .......... *G06F 16/215* (2019.01); *G06F 3/0641* (2013.01)

(58) Field of Classification Search
CPC .............................. G06F 16/215; G06F 3/0641
See application file for complete search history.

(56) References Cited

U.S. PATENT DOCUMENTS

| | | | |
|---|---|---|---|
| 8,392,384 B1 * | 3/2013 | Wu ..................... | G06F 16/1748 711/134 |
| 9,727,273 B1 * | 8/2017 | Dantkale ................ | G06F 11/14 |
| 11,288,132 B1 * | 3/2022 | Rajimwale .......... | G06F 11/1469 |
| 11,314,687 B2 | 4/2022 | Kavaipatti Anantharamakrishnan et al. | |
| 11,893,422 B2 | 2/2024 | Shilane et al. | |
| 11,907,077 B2 | 2/2024 | Madan et al. | |
| 11,934,279 B2 | 3/2024 | Madan et al. | |
| 2010/0031086 A1 * | 2/2010 | Leppard .............. | G06F 11/1662 714/15 |
| 2021/0064486 A1 * | 3/2021 | Rana .................... | G06F 11/1484 |
| 2023/0205443 A1 * | 6/2023 | Moon .................. | G06F 3/0608 711/154 |
| 2024/0264750 A1 * | 8/2024 | Bert .................... | G06F 12/0868 |

* cited by examiner

*Primary Examiner* — Alexander Khong
(74) *Attorney, Agent, or Firm* — BainwoodHuang

(57) ABSTRACT

Techniques coordinate deduplication among nodes. The techniques involve, in response to a lookup query to search a deduplication index for an entry that maps a fingerprint which is based on incoming data, detecting an invalid result. The techniques further involve, in response to detecting the invalid result, updating the deduplication index to include an entry that maps the fingerprint, the entry initially storing an "in-progress" flag. The techniques further involve, after the deduplication index is updated to include the entry that maps the fingerprint and after the incoming data is stored in a storage location, removing the "in-progress" flag from the entry.

17 Claims, 7 Drawing Sheets

COORDINATING DEDUPLICATION AMONG NODES

BACKGROUND

A conventional data storage system manages data on behalf of a set of host computers. Such a conventional data storage system may include multiple storage processors which concurrently process input/output (I/O) requests from the set of host computers.

During such operation, the storage processors may perform deduplication (e.g., generate fingerprints on data, check a fingerprint database to identify possible copies of the same data, compare the possible copies to determine whether the data is the same, etc. to avoid storing multiple copies of the same data and thus save storage). For example, the storage processors may perform inline deduplication in an attempt to avoid storing a new copy of data that has already been stored in the storage system. As another example, the storage processors may perform backend deduplication to find and remove a copy of data after that copy has been stored in the storage system.

SUMMARY

Unfortunately, in the above-described conventional data storage system, it is possible for the storage processors to miss deduplication opportunities when performing identical writes of new data in parallel. In this situation, the conventional data storage system does not detect processing of the identical writes of the new data. Rather, the conventional data storage system simply stores multiple copies of the same new data without even determining that the data has the same fingerprint thus wasting storage.

Along these lines, suppose that incoming input/output (I/O) requests to write the same new data are received simultaneously by a first storage processor and a second storage processor of the above-described conventional data storage system. In this situation, the first and second storage processors will generate the same fingerprint since the new data is the same.

Next, the first storage processor checks the fingerprint database while the second storage processor waits for access to the fingerprint database since fingerprint information within the fingerprint database must remain synchronized between the storage processors. At the completion of this check by the first storage processor, the first storage processor receives a null result indicating that the new data has not yet been stored in the conventional data storage system (i.e., indicating that currently there is no address in the fingerprint database for a storage location that stores data from which that fingerprint can be derived).

Then, the second storage processor checks the fingerprint database and, at the completion of this check by the second storage processor, the second storage processor also receives another null result also indicating that the new data has not yet been stored in the conventional data storage system. While the second storage processor performs this check of the fingerprint database, the first storage processor writes the new data into a first storage location since the storage processors are processing the identical writes of the new data in parallel.

When the second storage processor has finished accessing the fingerprint database and the first storage processor has finished writing the new data into the first storage location, the first storage processor then updates the fingerprint database with the address of the first storage location. While the first storage processor updates the fingerprint database with the address of the first storage location, the second storage processor writes the new data into a second storage location.

When the second storage processor has finished writing the new data into the second storage location, the second storage processor updates the fingerprint database with the address of the second storage location. Along these lines, the second storage processor overwrites the address of the first storage location with the address of the second storage location.

Accordingly, after both storage processors have finished processing the I/O requests, the above-described conventional data storage system now stores multiple copies of the new data. Moreover, the above-described conventional data storage system is unaware that there are multiple copies of the new data in storage, and the fingerprint information within the fingerprint database only identifies the address of the second storage location (i.e., the address of the first storage location was overwritten when the second storage processor updated the fingerprint database with the address of the second storage location).

One approach to addressing this deficiency is to create a communications channel between the storage processors to carry peer-to-peer communications or to enable shared memory exchanges. Such a communications channel could then be used by the storage processors to conduct communications back and forth during I/O request processing and therefore enable the storage processors to detect the processing of the identical writes of new data in parallel and thus avoid storing copies of the same data in storage. Unfortunately, such an approach would consume an extensive amount of critical resources as well as add significant latencies.

In contrast to the above-described conventional data storage system and approach, improved techniques are directed to coordinating deduplication among nodes using "in-progress" flags for fingerprints while data from which the fingerprints can be derived is being stored. For example, when a first node writes new data into storage, the first node generates a fingerprint from the new data and sets an "in-progress" flag for the fingerprint when accessing a deduplication index for possible deduplication (there is no deduplication because the data is new). The first node later removes the "in-progress" flag once the first node has finished writing the new data into storage. If a second node attempts to write the same new data in parallel with the first node, the second node will encounter the "in-progress" flag for the fingerprint and thus will detect that the first node is writing data that generated the same fingerprint into storage. Accordingly, the second node can simply write the new data into storage and mark the new data for backend deduplication checking (e.g., upon such detection, the second node can put the address of the new data on a list for checking by a backend deduplication service). As a result, there is no significant latency added by the nodes and the new data will be checked for possible deduplication.

One embodiment is direct to a method of coordinating deduplication. The method includes, in response to a lookup query to search a deduplication index for an entry that maps a fingerprint which is based on incoming data, detecting an invalid result. The method further includes, in response to detecting the invalid result, updating the deduplication index to include an entry that maps the fingerprint, the entry initially storing an "in-progress" flag. The method further includes, after the deduplication index is updated to include the entry that maps the fingerprint and after the incoming data is stored in a storage location, removing the "in-progress" flag from the entry. Another embodiment is directed to data storage equipment which includes an interface, storage constructed and arranged to store data, and nodes coupled with the interface and the storage. The nodes are constructed and arranged to perform a method of:

(A) in response to a lookup query to search a deduplication index for an entry that maps a fingerprint which is based on incoming data, detecting an invalid result, (B) in response to detecting the invalid result, updating the deduplication index to include an entry that maps the fingerprint, the entry initially storing an "in-progress" flag, and (C) after the deduplication index is updated to include the entry that maps the fingerprint and after the incoming data is stored in a storage location, removing the "in-progress" flag from the entry.

Yet another embodiment is directed to a computer program product having a non-transitory computer readable medium which stores a set of instructions to coordinate deduplication. The set of instructions, when carried out by the nodes, causes the nodes to perform a method of:

(A) in response to a lookup query to search a deduplication index for an entry that maps a fingerprint which is based on incoming data, detecting an invalid result;

(B) in response to detecting the invalid result, updating the deduplication index to include an entry that maps the fingerprint, the entry initially storing an "in-progress" flag; and (C) after the deduplication index is updated to include the entry that maps the fingerprint and after the incoming data is stored in a storage location, removing the "in-progress" flag from the entry.

In some arrangements, detecting the invalid result, updating the deduplication index, and removing the "in-progress" flag are carried out by a first node while a second node processes other incoming data.

In some arrangements, removing the "in-progress" flag from the entry includes replacing the "in-progress" flag stored in the entry with an address of the storage location.

In some arrangements, the lookup query is constructed and arranged to return one of (i) the invalid result when the deduplication index currently does not include an entry that maps the fingerprint, (ii) another address of another storage location when the deduplication index currently includes an entry that maps the fingerprint and the entry stores the other address of the other storage location, and (iii) the "in-progress" flag when the deduplication index currently includes the entry that maps the fingerprint and the entry stores the "in-progress" flag.

In some arrangements, detecting the invalid result, updating the deduplication index, and removing the "in-progress" flag form at least part of inline deduplication processing carried out by the first node.

In some arrangements, the method further includes, based on the other incoming data which is processed by the second node and in response to another lookup query to search the deduplication index for an entry that maps the fingerprint, detecting the "in-progress" flag. Additionally, the method includes, in response to detecting the "in-progress" flag, providing a notification to a late deduplication service by the second node, the notification directing the late deduplication service to perform late deduplication processing on the other incoming data.

In some arrangements, the method further includes:

(i) in response to a notification provided by the second node and in response to another lookup query to search the deduplication index for an entry that maps the fingerprint, detecting an address of the storage location by a late deduplication service;

(ii) in response to detecting the address of the storage location, comparing the incoming data stored in the storage location with the other incoming data by the late deduplication service; and (iii) performing a deduplication operation based on a result of comparing the incoming data stored in the storage location with the other incoming data by the late deduplication service.

In some arrangements, the notification resides on a late deduplication list having marked storage locations for late deduplication processing by the late deduplication service. Additionally, the late deduplication service is provided by at least one of the first node and the second node as a set of background processes.

In some arrangements, each of the first node and the second node is constructed and arranged to perform, on the deduplication index, lookup operations for fingerprints for new data.

In some arrangements, the lookup operations are configured to return:

(i) invalid results when fingerprints for new data are not mapped to valid addresses in the deduplication index, (ii) "in-progress" flags when fingerprints for new data are mapped to the "in-progress" flags and inline deduplication of the new data is currently in progress, and (iii) addresses of storage locations when fingerprints for new data are mapped to valid addresses and inline deduplication of the new data is completed.

It should be understood that, in the cloud context, at least some electronic circuitry is formed by remote computer resources distributed over a network (e.g., hosts, management equipment, etc.). Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic assemblies, components and circuitry which are involved in coordinating deduplication among nodes.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to coordinating deduplication among nodes using "in-progress" flags for fingerprints while data from which the fingerprints can be derived is being stored. For example, when a first node writes new data into storage, the first node generates a fingerprint from the new data and sets an "in-progress" flag for the fingerprint when accessing a deduplication index for possible deduplication (there is no deduplication because the data is new). The first node later removes the "in-progress" flag once the first node has finished writing the new data into storage. If a second node attempts to write the same new data in parallel with the first node, the second node will encounter the "in-progress" flag for the fingerprint and thus will detect that the first node is writing data that generated the same fingerprint into storage. Accordingly, the second node can simply write the new data into storage and mark the new data for backend deduplication checking (e.g., upon such detection, the second node can put the address of the new data on a list for checking by a backend deduplication service). Therefore, there is no significant latency added by the nodes and the new data will be checked for possible deduplication.

Figure 1:
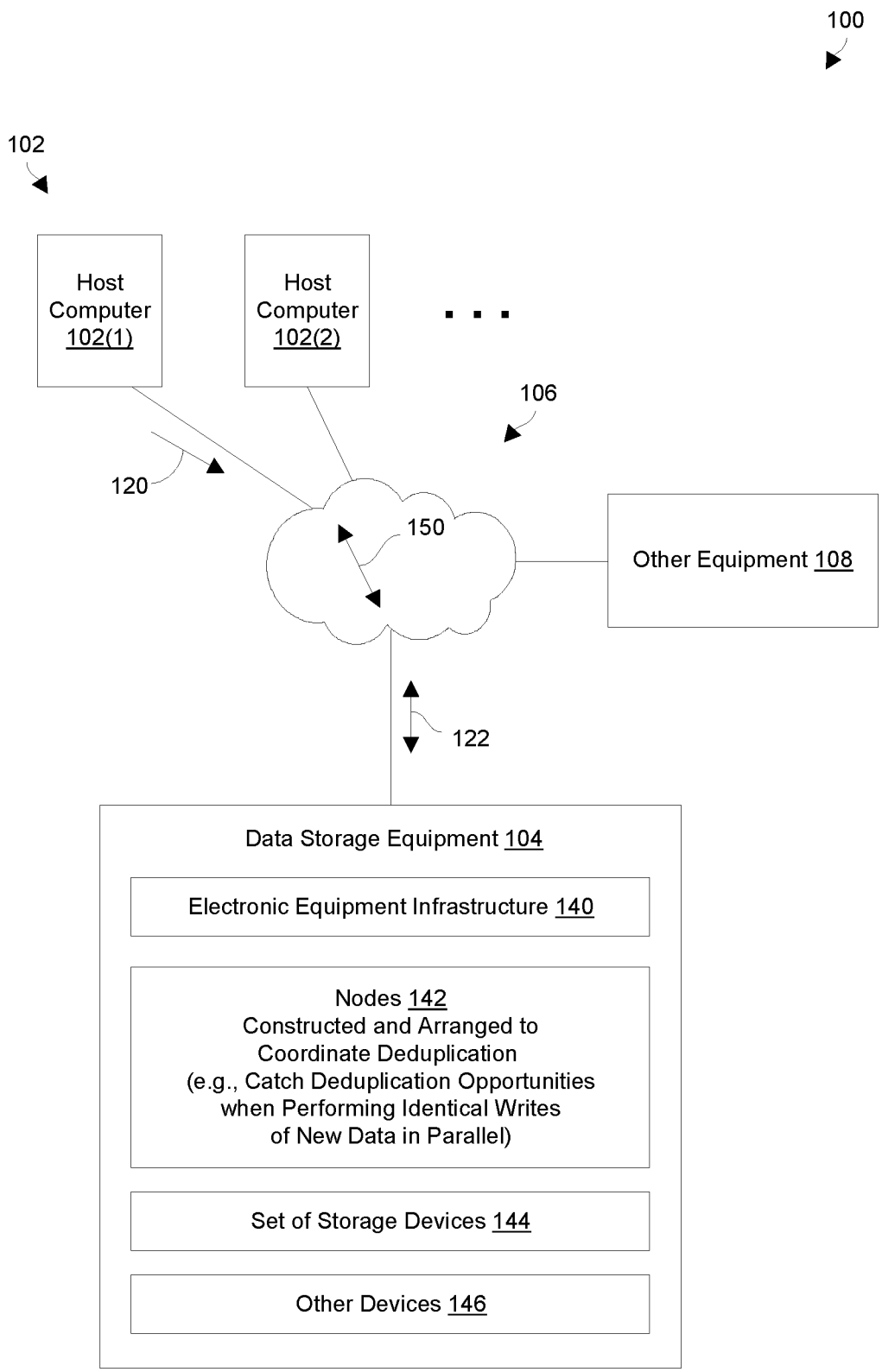
FIG. 1 is a block diagram of an electronic setting which coordinates deduplication among nodes in accordance with certain embodiments.

FIG. 1 shows an electronic setting 100 which coordinates deduplication among nodes in accordance with certain embodiments. By way of example, the electronic setting 100 is a data storage environment that includes host computers 102(1), 102(2), ... (collectively, host computers 102), data storage equipment 104, a communications medium 106, and perhaps other equipment 108. Other environments are suitable for use as well such as data centers, general purpose computing environments, server farms, cloud-based systems, corporate computing/infrastructure equipment, retail settings, manufacturing settings, government settings, academic settings, websites, environments for specialized operations, combinations thereof, and so on.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and retrieve host data 122 from storage (e.g., primary storage or main memory, secondary storage, tiered storage, combinations thereof, etc.).

The data storage equipment 104 is an example of electronic equipment that is capable of coordinating deduplication among nodes. The data storage equipment 104 includes an electronic equipment infrastructure 140, nodes 142, a set of storage devices 144, and other devices 146.

The electronic equipment infrastructure 140 is constructed and arranged to support operation of various components of the data storage equipment 104. To this end, the electronic equipment infrastructure 140 provides connectivity among the various components, conveys power signals from power converters to the various components, positions fans along air pathways to provide cooling to the various components (i.e., to remove heat), protects the various components against tampering, damage, and so on. To this end, the electronic equipment infrastructure 140 may include one or more frames or card cages, chassis/housings/cabinets, power supplies/converters, fans, backplanes or midplanes, and so on.

The nodes 142 are constructed and arranged to respond to the host I/O requests 120 received from the host computers 102 by writing data into the set of storage devices 144 and reading the data from the set of storage devices 144. The nodes 142 may be physical storage processing modules or engines, data movers, director boards, blades, etc. In accordance with certain embodiments, the nodes 142 may include a variety of specialized subcomponents such as processing circuitry to process I/O requests 120 from the host computers 102, cache memory to operate as read and/or write caches, on-board NICs to provide communications between the nodes 142 and/or external devices, LEDs and switches for local I/O, and so on. In some arrangements, the nodes 142 may be constructed and arranged to provide a virtualized environment (e.g., to support virtual machines, virtual data movers or VDMs, etc.). As will be explained in further detail shortly, while the nodes 142 process the host I/O requests 120, the nodes 142 coordinate deduplication to efficiently and effectively handle incoming identical writes of new data in parallel.

The set of storage devices 144 is constructed and arranged to store data within the data storage equipment 104. In accordance with certain embodiments, the set of storage devices 44 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

The other devices 146 of the data storage equipment 104 are constructed and arranged to provide supporting features. Along these lines, the other devices 146 may include a set of communications interfaces (e.g., a set of network interface controllers or NICs) that provide communications for the data storage equipment 104, a user interface for local user access, backup power sources, and so on.

The communications medium 106 is constructed and arranged to connect the various components of the electronic setting 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the electronic setting 100. Along these lines, the other equipment 108 may include remote data storage equipment that provides data to and/or receives data from the data storage equipment 104 (e.g., replication arrays, backup and/or archiving equipment, external service processors and/or management/control devices, etc.).

During operation, the data storage equipment 104 processes I/O requests 120 from the set of host computers 102 to perform useful work. In particular, the nodes 142 write host data 122 into and retrieve host data 122 from the set of storage devices 144 in response to the I/O requests 120.

During such operation, the nodes 142 perform deduplication in order to save storage space. Such deduplication involves accessing a deduplication index, i.e., a repository of fingerprint mapping entries corresponding to data stored in the set of storage devices 144.

As will be explained in further detail shortly, the nodes 142 are able to catch and process deduplication opportunities when performing identical writes of new data in parallel. Such duplication coordination among the nodes 142 utilizes "in-progress" flags of the fingerprint mapping entries within the deduplication index. Such an "in-progress" flag for a fingerprint serves as an indication that there is a write operation underway to store new data that generates that fingerprint. Further details will now be provided with reference to FIG. 2.

Figure 2:
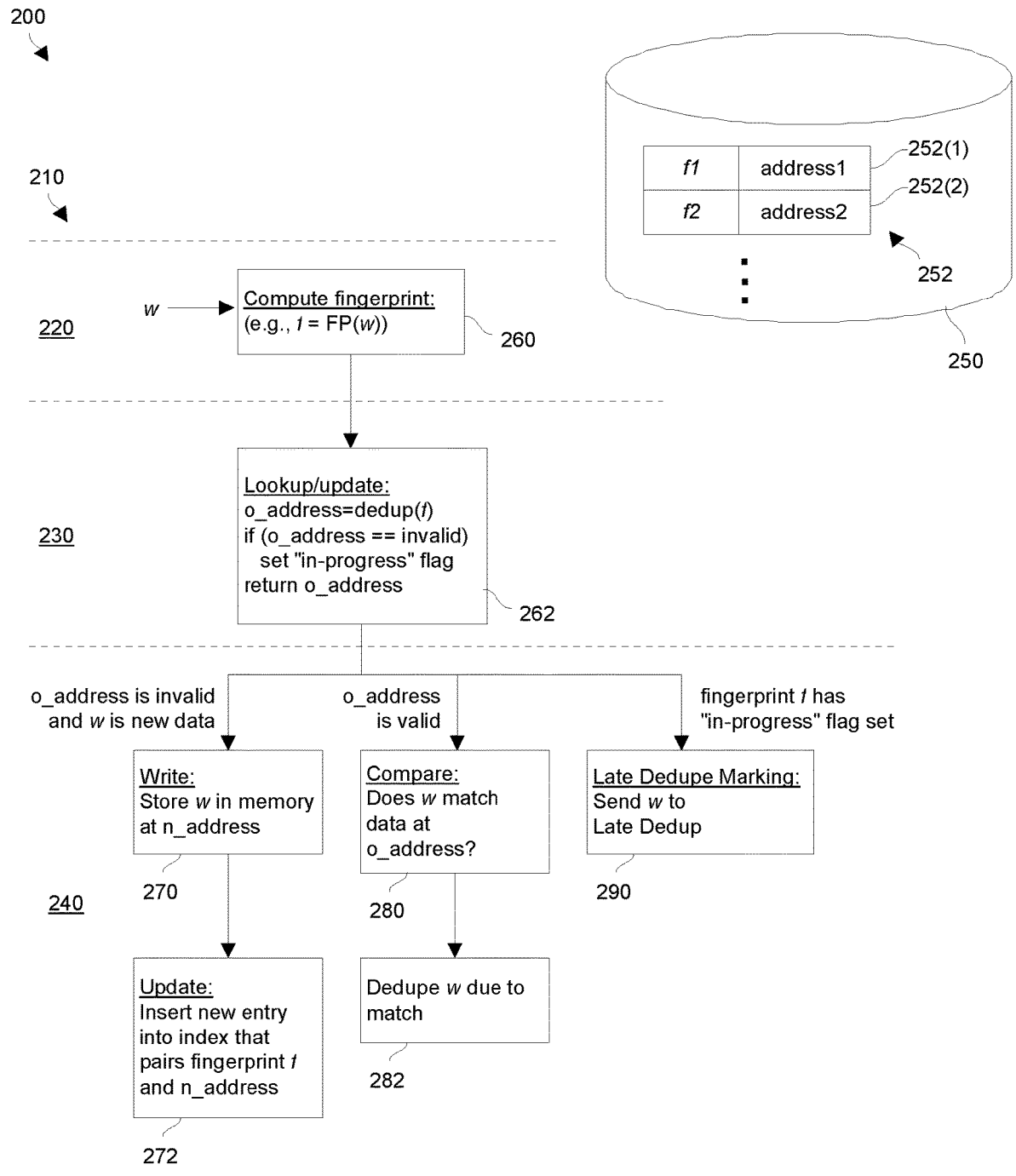
FIG. 2 is a flow diagram of a set of operations in accordance with certain embodiments.

FIG. 2 shows a flowchart of a procedure 200 which is performed by the nodes 142 in accordance with certain embodiments. While the nodes 142 perform the procedure 200, the nodes 142 are able to process identical writes of new data in parallel and detect such processing as a deduplication opportunity in order to deduplicate the new data. Accordingly, the nodes 142 do not merely write the same data to storage multiple times and miss the opportunity to perform deduplication (which may also be referred to as "an evicted collision"). Instead, the nodes 142 detect the identical writes of the new data in parallel and take advantage of the opportunity to deduplicate the new data.

As shown in FIG. 2, the procedure 200 includes a series 210 of processing stages (or phases) 220, 230, and 240. When a node 142 performs the procedure 200, the node 142 performs various operations in each of the stages 220, 230, and 240. As will be explained in further detail below, the nodes 142 are able to coordinate deduplication efforts without extensive back and forth internode communications that would otherwise create long latencies during such operation.

Along these lines, the nodes 142 are able to access a deduplication index 250. The deduplication index 250 includes fingerprint mapping entries 252(1), 252(2), . . . (collectively, entries 252) which map fingerprints to storage locations containing data that generates the fingerprints.

As will be explained in further detail shortly and in accordance with certain embodiments, the entries 252 do not include the fingerprints but instead the fingerprints serve as keys to the entries 252. Along these lines, all of the keys may be initially mapped to an "invalid" value by default. Then, as a first node 142 writes new data to storage, the first node 142 initially updates the deduplication index 250 such that the key generated by the new data maps to an "in-progress" flag as the data is being written. Later, once the first node 142 has written the new data to a storage location, the first node 142 updates the deduplication index 250 such that the key maps to the address of the storage location holding the new data (i.e., an actual address which is valid).

Accordingly, if a second node 142 accesses the same fingerprint entry 252 in the deduplication index 250 to store other new data after the first node 142 sets the "in-progress" flag but before the first node 142 stores a valid address, the second node 142 detects that the fingerprint that the second node generated maps to the "in-progress" flag. Accordingly, the second node 142 understands that another node 142 is performing a write operation which writes new data that generates the same fingerprint. As a result, the second node 142 may identify the other new data for subsequent deduplication (e.g., late deduplication by a background deduplication service).

As shown in FIG. 2, fingerprints f may operate as keys to identifying (or looking up) particular entries 252 within the deduplication index 250. Accordingly, the entries 252 are configured to pair these fingerprints f (or keys) with addresses of storage locations that hold data from which the fingerprints f were generated. For example, as shown in FIG. 2, the entry 252(1) pairs a fingerprint f1 with address1 which stores data used to generate the fingerprint f1. Similarly, the entry 252(2) pairs a fingerprint f2 with address2 which stores data used to generate the fingerprint f2, and so on.

It should be appreciated that, while a node 142 accesses the deduplication index 250, another node 142 waits to access to the deduplication index 250 to preserve synchronization (or integrity). Along these lines, lookup/update operations performed on the deduplication index 250 are atomic. Accordingly, a node 142 is able to detect an invalid result for a fingerprint f and set the "in-progress" flag for the fingerprint f before another node 142 is able to access the deduplication index 250. Similarly, a node 142 is able to remove the "in-progress" flag for the fingerprint f and store the address to a location of new data that generates the fingerprint f before another node 142 is able to access the deduplication index 250. As a result, only one node 142 accesses the deduplication index 250 at a time to enable the deduplication index 250 to remain synchronized among the nodes 142.

In some arrangements and as will be described in further detail shortly, the "in-progress" flag is stored in the same fields as addresses within the deduplication index 250. In such arrangements, the "in-progress" flag is removed and the address is stored for a fingerprint f by simply overwriting the "in-progress" flag with the address.

At stage 220 (see FIG. 2), a node 142 performs a fingerprint generation operation 260. The fingerprint generation operation 260 computes a fingerprint f from data w to be stored in order to determine whether to deduplicate the data w. In some arrangements, the node 142 applies a hash function FP( ) to the data w and uses a result (i.e., a hash value) as the fingerprint f. In some arrangements, the result may be further processed into the fingerprint f (e.g., truncated, extended, parsed, checked against a list, rejected so that a different hash function is applied, combinations thereof, etc.).

At stage 230, the node 142 performs a lookup/update operation 262 on the deduplication index 250 in case the data w has been encountered before. The lookup/update operation 262 returns, as a lookup result, an outputted address (o_address). If the outputted address (o_address) is an invalid value (e.g., an invalid address such as a null value or a value that is out of bounds from a valid address range, etc.), the node 142 concludes that the deduplication index 250 has not yet paired the fingerprint f with any actual storage location so the data w to be stored is new. In this situation, the node 142 updates the deduplication index 250 to include a fingerprint mapping entry 252 for the fingerprint f which has the "in progress" flag set. Such an entry 252 maps the fingerprint f to the "in progress" flag thus enabling another node 142 which may be performing a lookup/update operation in parallel to know that there is an operation currently in progress to process data which generates the fingerprint f.

At stage 240, the node 142 performs a certain set of operations depending on the lookup result. Along these lines, the lookup result may indicate that (i) data w which generates the fingerprint f is not currently stored, (ii) the data w may already be stored, or (iii) there is an operation in progress that is currently storing data that generates the fingerprint f.

More particularly, if the outputted address (o_address) is an invalid value, the node 142 knows that the data w which generates the fingerprint f is not currently stored. Accordingly, the node 142 performs a write operation 270 which stores the data w at a new address (n_address) in storage (also see the set of storage devices 144 in FIG. 1). Additionally, the node 142 performs an update operation 272 on the deduplication index 250 which removes the "in-progress" flag for the fingerprint f, and pairs the fingerprint f with the new address (n_address) of the storage location which holds the data w.

On the other hand, if the outputted address (o_address) is a valid value, the node 142 understands that the data w may already be stored because there is already a fingerprint mapping entry 252 in the deduplication index 250 that pairs the fingerprint f with an address to actual data. In this situation, the node 142 performs a comparison operation 280 which compares the data w to be stored and the data at the outputted address (o_address). If the comparison is successful and the data matches, the node 142 performs a deduplication operation 282 to deduplicate the data. Along these lines, the node 142 may adjust metadata such that just one copy of the data w is in storage although that one copy represents multiple instances for different storage objects (e.g., files).

Alternatively, if the node 142 determines that there is an operation in progress that is currently storing data that generates the fingerprint f (e.g., the node 142 detects that the "in-progress" flag is set for the fingerprint f), the node 142 may perform a late deduplication marking operation 290 which marks the data w to be stored for processing by a background deduplication service. Along these lines, the node 142 may label the data w for processing by the background deduplication service or even move the data w to a designated area in memory which is optimized for late deduplication processing. Accordingly, the opportunity to deduplicate the data w is not missed/overlooked, but instead competently captured and handled. Further details will now be provided with reference to FIGS. 3 through 6.

Figure 3:
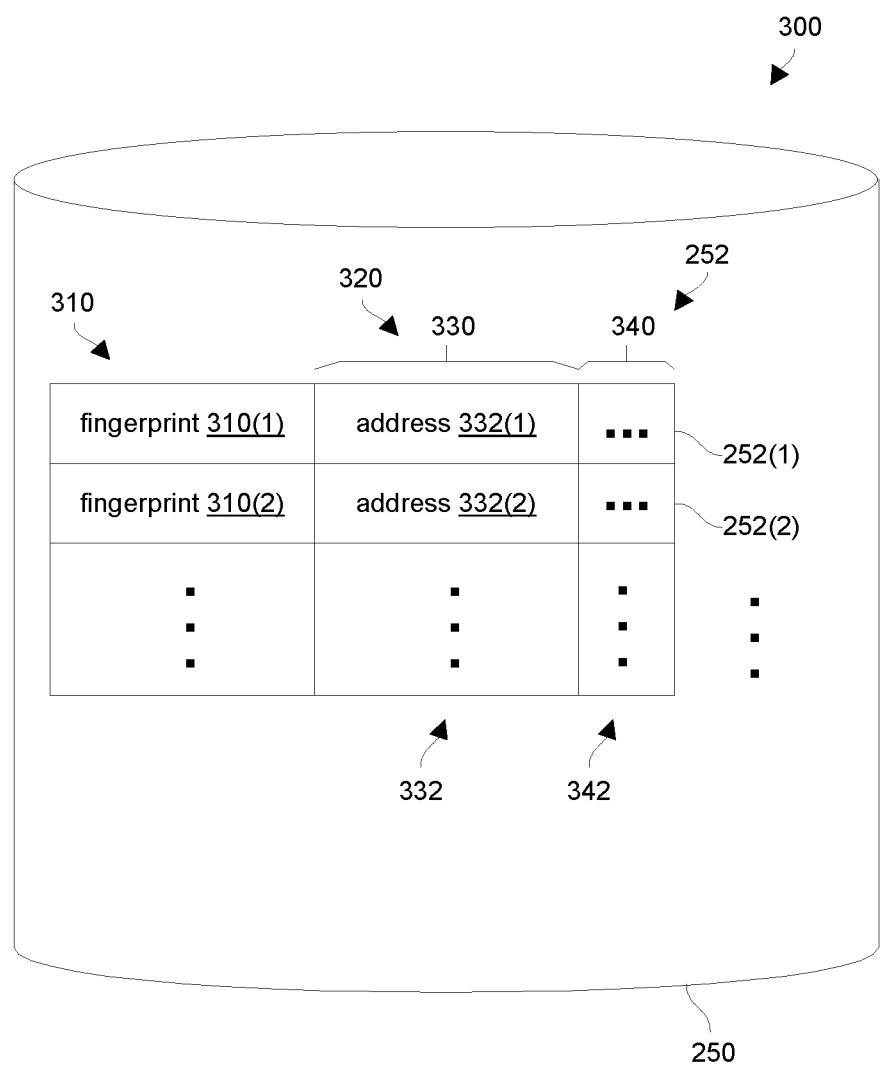
FIG. 3 is a block diagram of a deduplication index at a first time of operation in accordance with certain embodiments.
Figure 4:
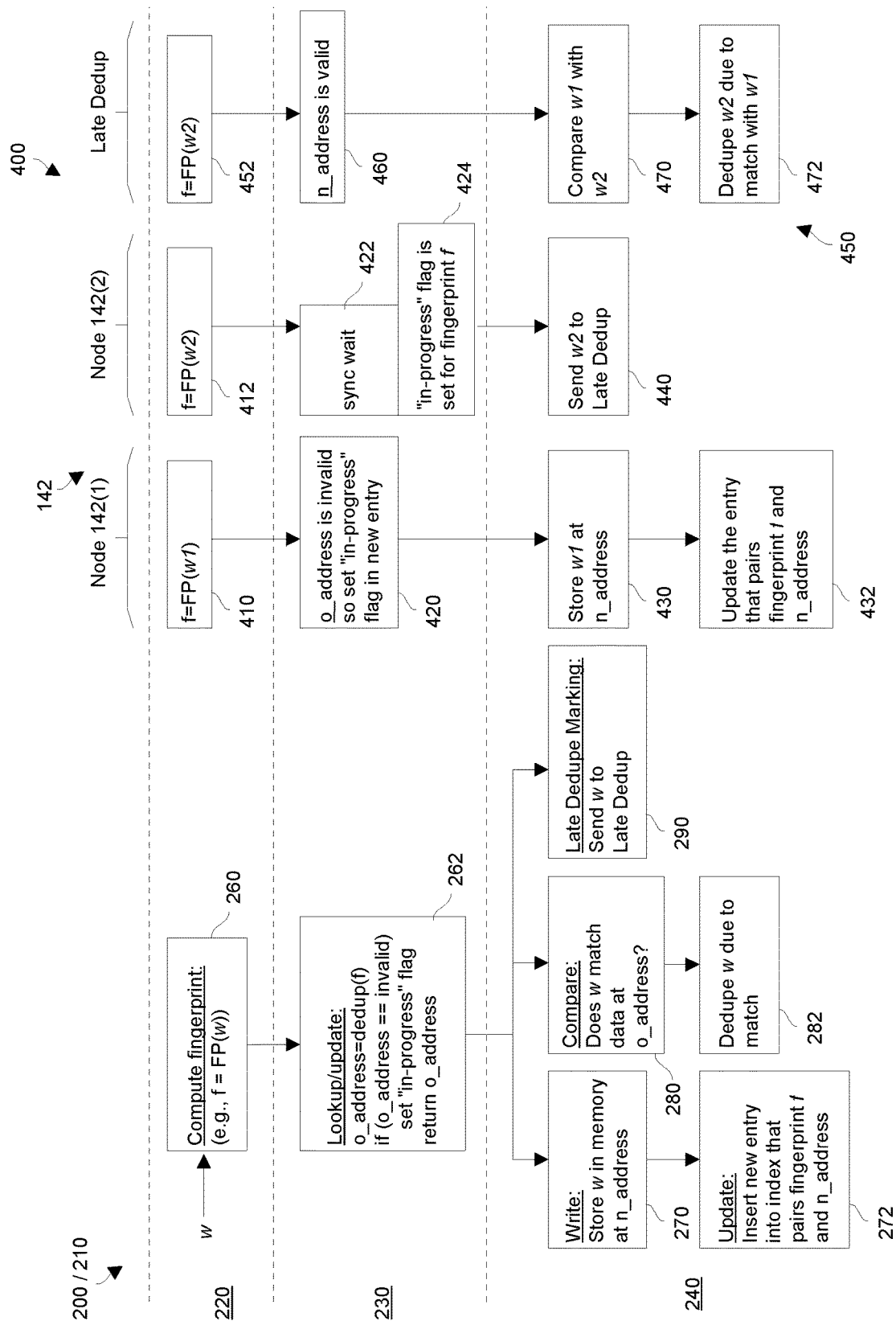
FIG. 4 is the flow diagram illustrating processing of identical writes in parallel in accordance with certain embodiments.
Figure 5:
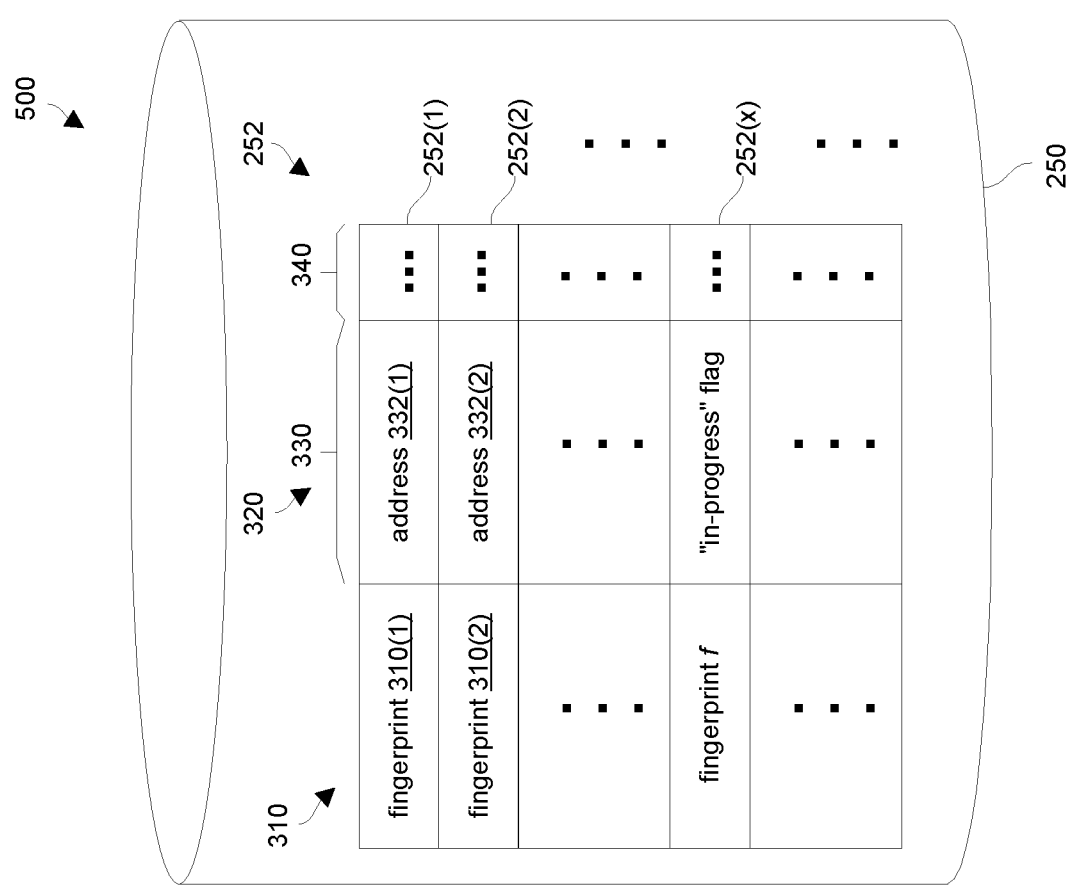
FIG. 5 is a block diagram of the deduplication index at a second time of operation in accordance with certain embodiments.
Figure 6:
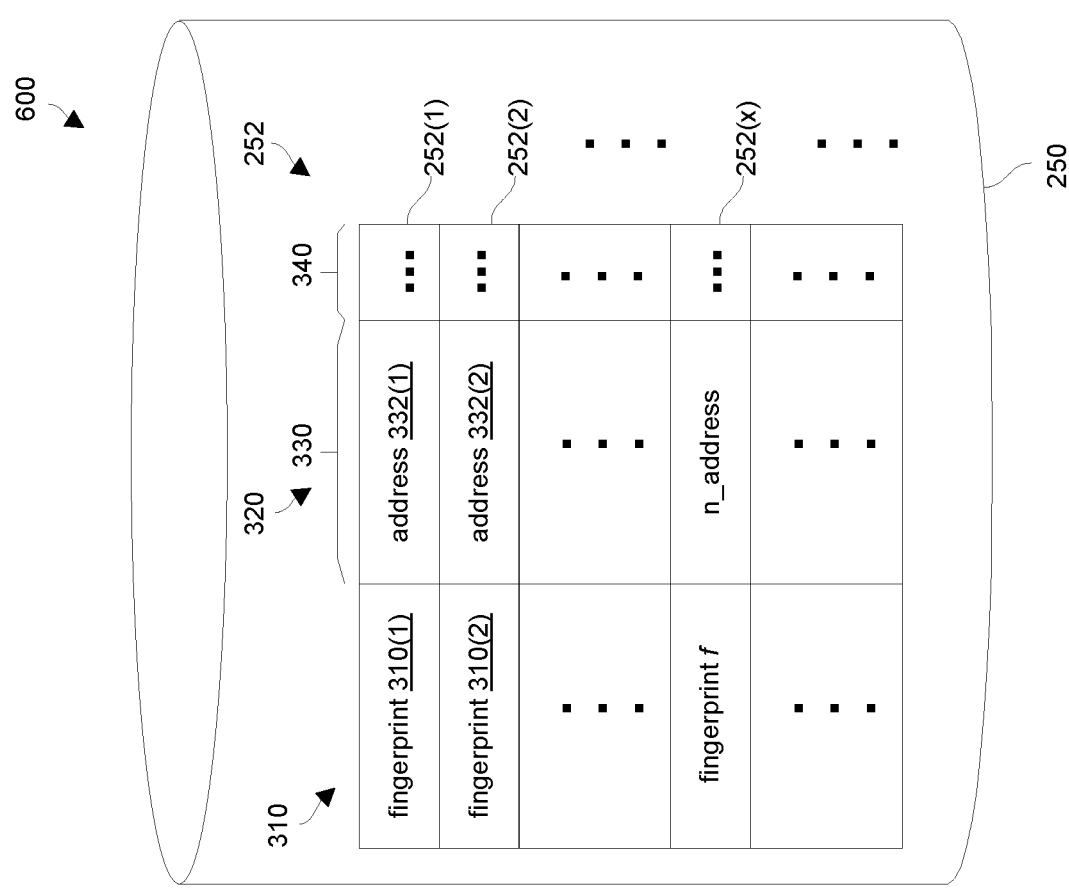
FIG. 6 is a block diagram of the deduplication index at a third time of operation in accordance with certain embodiments.

FIGS. 3 through 6 illustrate how the nodes 142 of the data storage equipment 104 (FIG. 1) process identical writes of new data in parallel to accomplish deduplication in accordance with certain embodiments. FIG. 3 shows a detailed view 300 of the deduplication index 250 at a first time (t1). FIG. 4 shows a view 400 depicting how multiple nodes 142 are able to perform the procedure 200 in parallel to coordinate deduplication. FIG. 5 shows a detailed view 500 of the deduplication index 250 at a second time (t2) which is after the first time (t1). FIG. 6 shows a detailed view 600 of the deduplication index 250 at a third time (t3) which is after the second time (t2).

FIG. 3 shows a view 300 of the deduplication index 250 at a first time (t1) of operation in accordance with certain embodiments. The deduplication index 250 may reside in memory of the data storage equipment 104 (FIG. 1) such as in primary (or main) memory, in secondary storage, distributed among both, etc. As mentioned earlier, the nodes 142 utilize the deduplication index 250 as part of a deduplication process to minimize and/or eliminate storing multiple copies of the same data and thus save storage space.

As shown in FIG. 3, fingerprints 310 operate as keys to the entries 252(1), 252(2), . . . of the deduplication index 250. For example, the fingerprint 310(1) identifies the entry 252(1). Similarly, the fingerprint 310(2) identifies the entry 252(2), and so on.

Additionally, the entries 252 include a set of fields 320 such as address fields 330 to hold addresses 332 of storage locations, and optionally other fields 340 to storage other useful information 342 (e.g., control/status field, etc.). Along these lines, the fingerprint 310(1) identifies the entry 252(1) and pairs with the address 332(1) to indicate that data which generated the fingerprint 310(1) is stored at the address 332(1). Likewise, the fingerprint 310(2) identifies the entry 252(2) and pairs with the address 332(2) to indicate that data which generated the fingerprint 310(2) is stored at the address 332(2), and so on.

As mentioned earlier, if the deduplication index 250 does not include an entry 252 that pairs a fingerprint 310 with a valid address 332, the data that generates that fingerprint 310 is currently not stored in the data storage equipment 104. Additionally, as mentioned earlier, when a node 142 accesses the deduplication index 250, another node 142 waits to access to the deduplication index 250 to preserve synchronization such that only one node 142 accesses the deduplication index 250 at a time to keep the information within the deduplication index 250 synchronized among the nodes 142.

With the deduplication index 250 having an initial state as shown in FIG. 3 (at time (t1) of operation), suppose that the nodes 142 receive identical writes of new data in parallel. Along these lines, FIG. 4 shows a view 400 of certain node activities which are performed when nodes 142(1) and 142(2) process identical writes of new data in parallel to accomplish deduplication in accordance with certain embodiments. Such activities correspond to the procedure 200 (also see FIG. 2) and are therefore aligned in FIG. 4 with the earlier described stages 210 of the procedure 200.

As mentioned earlier, the stage 220 of the procedure 200 involves performing a fingerprint generation operation 260. In particular, at 410, suppose that the node 142(1) generates a fingerprint from data w1. At the same time (e.g., in parallel), at 412, suppose that the node 142(2) generates the same fingerprint from data w2. Along these lines, the node 142(1) may apply a hash function FP( ) to the data w1 and concurrently the node 142(2) may apply the same hash function FP( ) to the data w2. As a result, both nodes 142(1), 142(2) generate the same fingerprint f.

As also mentioned earlier, the stage 230 of the procedure 200 involves performing a lookup/update operation 262 on the deduplication index 250 in case the data to be stored has been encountered before. Along these lines, suppose that the node 142(1) obtains access to the deduplication index 250 ahead of the node 142(2). The view 300 of the deduplication index 250 in FIG. 3 illustrates the current state of the deduplication index 250 at a first time (t1) of operation while the deduplication index 250 does not have an entry 252 for the fingerprint f.

At 420, the node 142(1) performs a lookup/update operation 262 which returns, as a lookup result, an outputted address (o_address) which is invalid. That is, since the nodes 142 are performing identical writes of new data in parallel, the data w1 is new. Accordingly, the deduplication index 250

(FIG. 3) maps the fingerprint f to an invalid value because the data w1 has not yet been encountered.

Since the outputted address (o_address) is invalid, the node 142(1) sets the "in progress" flag for the fingerprint f. Along these lines and as shown in the view 500 of FIG. 5, the node 142(1) may insert a new entry 252(x) into the deduplication index 250 which maps the fingerprint f to the "in progress" flag. That is, the fingerprint f becomes the key to the entry 252(x).

In some arrangements, the node 142(1) stores the "in progress" flag in the address field 330 of the entry 252(x). In other arrangements, the node 142(1) stores the "in progress" flag in a different field (e.g., see the fields 340) which is then routinely checked by the nodes 142. At this point at time (t2), the updated deduplication index 250 (FIG. 5) reflects that the data storage equipment 104 is currently writing data that generates the fingerprint f because the "in-progress" flag is now set in the entry 252(x) for the fingerprint f.

Still in the stage 230 of the procedure 200, at 422, while the node 142(1) has access to the deduplication index 250, the node 142(2) waits for the deduplication index 250 to become available. As a result, integrity of the deduplication index 250 is maintained.

At 424, when the node 142(1) relinquishes access to the deduplication index 250, the node 142(2) obtains access to the deduplication index 250 and detects that the "in-progress" flag is now set for the fingerprint f. In particular, the node 142(2) performs a lookup/update operation 262 which returns, as a lookup result, the "in-progress" flag. It should be understood that, in some arrangements, the "in-progress" flag is stored in a field other than the address field 330 and that the nodes 142 may easily and conveniently check that other field to determine whether the "in-progress" flag is set (e.g., see the fields 340).

As mentioned earlier, the stage 240 of the procedure 200 involves performing certain sets of operations depending on the lookup result. Along these lines, at 430, since the lookup result received by the node 142(1) indicates that data w1 which generates the fingerprint f is not currently stored, the node 142(1) stores the data w1 at a new address (n_address).

Then, at 432, the node 142(1) updates the entry 252(x) for the fingerprint f in deduplication index 250. In particular, the node 142(1) removes (or clears) the "in-progress" flag for the fingerprint f and pairs the fingerprint f with the new address (n_address) to the storage location that now stores the data w1. In some arrangements in which the "in-progress" flag is placed in the address field 330, the node 142(1) simply overwrites the "in-progress" flag with the new address (n_address) to remove the "in-progress" flag from the entry 252(x). This update of the deduplication index 250 at a time (t3) is shown in the view 600 of FIG. 6.

At 440, the node 142(2) does not just store the data w1 in storage and update the deduplication index 250 in the same manner as that of the node 142(1). Rather, the node 142(2) sends the data w2 to a list (or marks the data w2) for processing by the background deduplication service. In some arrangements, the data w2 is moved to designated storage which is optimized for processing by the background deduplication service. Accordingly, the background deduplication service may then perform late dedupe processing on the data w2 to save storage.

Along these lines, FIG. 4 further shows a series 450 of operations which are performed by the background deduplication service for late dedupe. In some arrangements, one of the nodes 142 may provide the background deduplication service as a low priority background task during available processing cycles.

At 452 (e.g., also see stage 220 of the procedure 200), the background deduplication service performs a fingerprint generation operation 260 now that the data w2 has been listed or marked for late dedupe processing. Along these lines, the background deduplication service generates a fingerprint f from the data w2.

At 460 (e.g., also see stage 230 of the procedure 200), the background deduplication service performs a lookup/update operation 262. Along these lines, the background deduplication service receives the valid address (n_address) since the entry 252(x) now pairs the fingerprint f with the address of the storage location that holds the data w1 (also see FIG. 6).

At 470 (e.g., also see stage 240 of the procedure 200), the background deduplication service performs a comparison operation 280 which compares the data w1 which is stored at the address (n_address) with the data w2. Since the data w1 and the data w2 are from identical writes, the data matches (e.g., a result of a bit-by-bit comparison indicates that the data is the same).

At 472, the background deduplication service performs a deduplication operation 282 to deduplicate the data. In particular, the node 142 may adjust metadata such that just one copy of the data (e.g., the data w1) is in storage although that one copy represents the outcome of identical writes of new data in parallel. Moreover, such coordination to achieve deduplication of the data did not require extensive internode communications that would otherwise create long latencies during such operation. Further details will now be provided with reference to FIG. 7.

Figure 7:
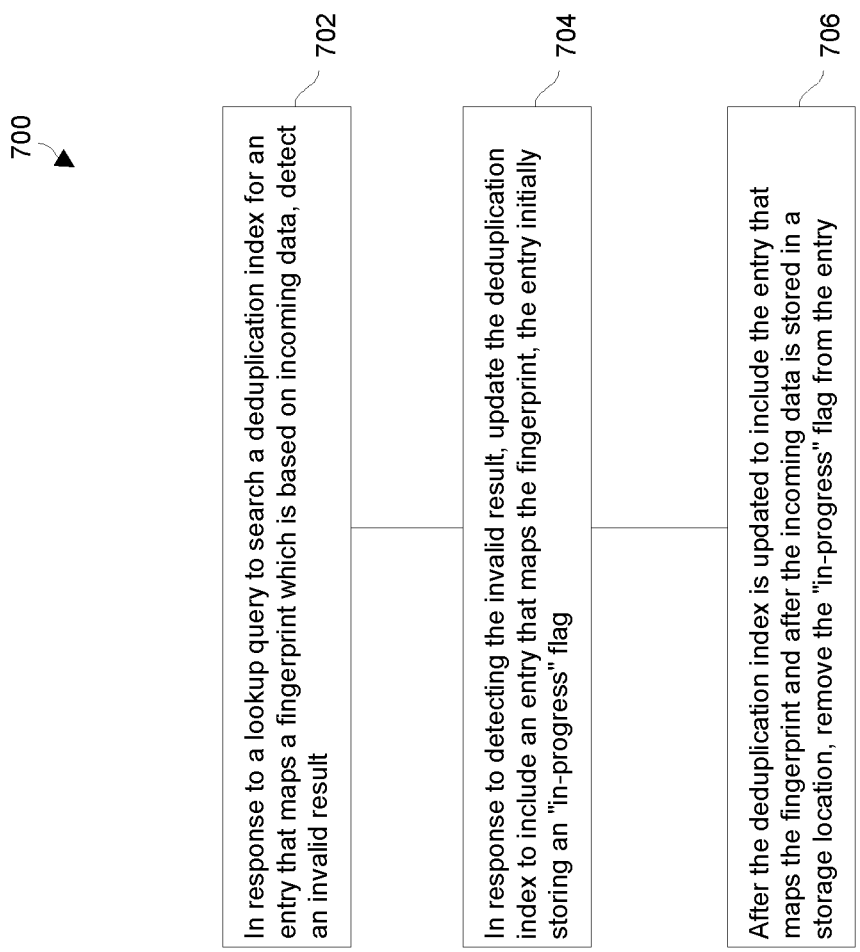
FIG. 7 is a flowchart of a procedure which is performed in order to coordinate deduplication among nodes in accordance with certain embodiments.

FIG. 7 shows a procedure 700 which is performed in order to coordinate deduplication among nodes in accordance with certain embodiments. Such a procedure 700 enables specialized circuitry (e.g., nodes of data storage equipment) to accomplish deduplication for identical writes of new data in parallel without requiring extensive internode communications and consuming excessive resources.

At 702, the specialized circuitry, in response to a lookup query to search a deduplication index for an entry that maps a fingerprint which is based on incoming data, detects an invalid result. Such an invalid result indicates that the deduplication index does not have an entry which pairs the fingerprint with a valid address.

At 704, the specialized circuitry, in response to detecting the invalid result, updates the deduplication index to include an entry that maps the fingerprint, the entry initially storing (or mapping the fingerprint to) an "in-progress" flag. In some arrangements, the specialized circuitry inserts an entry for the fingerprint in the deduplication index (e.g., where the fingerprint serves as a key to the entry) and sets the "in-progress" flag of that entry (e.g., stores the "in-progress" flag in the address field).

At 706, the specialized circuitry, after the deduplication index is updated to include the entry that maps the fingerprint and after the incoming data is stored in a storage location, removes the "in-progress" flag from the entry. In some arrangements, the specialized circuitry removes the "in-progress" flag by replacing the "in-progress" flag in the address field with the address to the storage location that now stores the data.

As described above, improved techniques are directed to coordinating deduplication among nodes 142 using "in-progress" flags for fingerprints while data from which the fingerprints can be derived is being stored. For example, when a first node 142(1) writes new data into storage, the first node 142(1) generates a fingerprint from the new data and sets an "in-progress" flag for the fingerprint when accessing a deduplication index 250 for possible deduplication (there is no deduplication because the data is new). The first node 142(1) later removes the "in-progress" flag once the first node 142(1) has finished writing the new data into storage. If a second node 142(2) attempts to write the same new data in parallel with the first node 142(1), the second node 142(2) will encounter the "in-progress" flag for the fingerprint and thus will detect that the first node 142(1) is writing data that generated the same fingerprint into storage. Accordingly, the second node 142(2) can simply write the new data into storage and mark the new data for backend deduplication checking (e.g., upon such detection, the second node can put the address of the new data on a list for checking by a backend deduplication service). As a result, there is no significant latency added by the nodes 142 and the new data will be checked for possible deduplication.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It may be advantageous to avoid losing potential dedupe between two identical writes processed in parallel by two nodes, without adding an internode communication operation.

That is, in accordance with certain embodiments, given a dual-node managing user IOs system that detect dedupes (when users write the same data in two different addresses, the system may persistently hold this data in the memory only once and define both user addresses to point to the same place in memory). Consider the case where two nodes handle duplicate inputs at the same time, and due to race condition, none of them detect a dedupe to the other. This scenario may be referred to as "an evicted collision". However, with certain improvements disclosed herein, such evicted collisions may be avoided by detecting one of these writes as dedupe of the other. Moreover, such a situation may be handled without adding an internode communication operation (which are very expensive in terms of latency).

In accordance with certain embodiments, the following terms are suitable for use:

Fingerprint—For every user write we match a semi-unique fingerprint created by a hash function (a hash-collision of different writes is rare). This fingerprint helps us to find a potential dedupe target, a former user write in memory that, with high probability, is identical to this new user write (identical writes have identical fingerprints).

Dedupe Index—A hash map between fingerprints and the memory address of a matched user-write. The Dedupe index is a shared database of the peer nodes, and all operations on it (get, set) must be synchronized. Whenever a new unique user write saved in memory, the corresponsive entry added to Dedupe Index.

Lookup query—Given an income user write, the first step of the dedupe search (after calculating its fingerprint) is to look for its fingerprint in the Dedupe Index. We call it a Lookup query. If such key exists in the Dedupe Index, its value is an address of a potential dedupe target and later we verify if the two data pages are identical. Otherwise (no entry for this fingerprint in Dedupe Index), we mark this user write as unique (and later adding the corresponding Dedupe Index entry for it). Like every operation on Dedupe Index, Lookup is a synchronized operation.

Inline vs late dedupe—The dedupe search process (FIG. 1) is either part of the Flush flow, i.e., the first arrival of the user write (inline dedupe), or part of background processes, later. i.e., we write it to memory without checking if deduped, but marked as "late dedupe" and will check it later. If income user writes marked for late dedupe, we don't add it to Dedupe Index but only after the late dedupe search.

Consider the case of identical user writes flushed by different nodes at the same time. Along these lines, assume data w_1 and data w_2 are flushed by node n_1 and node n_2, respectively. In a conventional system, each node sends a lookup query while the peer node doesn't add an entry for this data in the Dedupe Index. As a result, both writes will end up as unique.

This case is called an evicted collision. Evicted collision is an example of a dedupe lost which decreases the DRR (data reduction ratio) of the system. Such a conventional system allows such an evicted collision scenario, and naïve solutions require adding synchronized queries or internode connection operations to the flush flow, which can cause significant latency.

However, in accordance with certain embodiments, one of the nodes may be informed (without loss of generality) about a potential evicted collision situation and avoid it by marking a second copy of the data (w_2) for late dedupe. This solves the issue by assuring that before w_2 is processed as a late dedupe, the node n_1 will finish updating the dedupe index with the w_1 entry. Hence the lookup query for w_2 will return w_1, as required.

All that is left is to find a way to inform the node n_2 about the potential evicted collision state and doing it without any new internode communication or shared database synchronized operations, that would otherwise result in poor latency. In accordance with certain embodiments, an improved apparatus adds a side effect to a synchronized lookup query.

That is, another optional value is added in the Dedupe Index, e.g., a fingerprint is mapped to either a memory address or to a 'stab' flag (or "in-progress" flag). Whenever a lookup query looks for a fingerprint that doesn't exist in Dedupe Index, it also adds a 'temp' entry for this fingerprint, mapped to the 'stab' value. This 'stab' value will stay there until flush ends and adds the real corresponding entry with the correct memory address value. In this way, for the entire dedupe and flushing process (from lookup-to dedupe Index update) this stab value points out that an input with this fingerprint is now in-process in the peer node.

So, in a lookup query, the nodes may look for a certain entry in the dedupe Index. If the fingerprint (or key) is mapped to valid data-mark this data as dedupe target and continue. However, if the fingerprint is mapped to an invalid address (or an invalid result is returned),—set the contents of the address field to be stab, and keep processing as unique data. If fingerprint is mapped to stab, mark this page as late-dedupe, i.e., to try again later, when probably this key mapping will be a valid data. If the fingerprint is still mapped to stab, mark again as late-dedupe.

In accordance with certain embodiments, a new efficient way to avoid evicted collisions is performed without causing any additional latency to flush process. Moreover, DRR is improved by reducing dedupe loss.

In some arrangements, an invalid value is replaced with a 'stab' flag. However, a real address pointer replaces the 'stab' flag once the data is stored. For the same data that is not yet stored, the circuitry manages to mark one write as dedupe of the other, without adding new internode connection step.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of coordinating deduplication, the method comprising:
   in response to a lookup query to search a deduplication index for an entry that maps a fingerprint which is based on first incoming data, detecting an invalid result;
   in response to detecting the invalid result, updating the deduplication index to include an entry that maps the fingerprint, the entry initially storing an "in-progress" flag;
   performing a write operation including storing the first incoming data in a storage location, the "in-progress" flag indicating that the write operation is underway to store the first incoming data in the storage location; and
   having stored the first incoming data in the storage location, updating the deduplication index including removing the "in-progress" flag from the entry,
   wherein detecting the invalid result, updating the deduplication index to include the entry that maps the fingerprint, performing the write operation including storing the first incoming data in the storage location, and updating the deduplication index including removing the "in-progress" flag from the entry, are carried out by a first node, while a second node performs an identical write operation, in parallel with the write operation being performed by the first node, to store other incoming data that is the same as the first incoming data.

2. The method of claim 1 wherein removing the "in-progress" flag from the entry includes:
   replacing the "in-progress" flag stored in the entry with an address of the storage location.

3. The method of claim 2 wherein the lookup query is constructed and arranged to return one of (i) the invalid result when the deduplication index currently does not include an entry that maps the fingerprint, (ii) another address of another storage location when the deduplication index currently includes an entry that maps the fingerprint and the entry stores the other address of the other storage location, and (iii) the "in-progress" flag when the deduplication index currently includes the entry that maps the fingerprint and the entry stores the "in-progress" flag.

4. The method of claim 1 wherein detecting the invalid result, updating the deduplication index to include the entry that maps the fingerprint, performing the write operation including storing the first incoming data in the storage location, and updating the deduplication index including removing the "in-progress" flag from the entry, form at least part of inline deduplication processing carried out by the first node.

5. The method of claim 4, further comprising:
   based on the other incoming data which is processed by the second node and in response to another lookup query to search the deduplication index for an entry that maps the fingerprint, detecting the "in-progress" flag;
   in response to detecting the "in-progress" flag, providing a notification to a late deduplication service by the second node, the notification directing the late deduplication service to perform late deduplication processing on the other incoming data.

6. The method of claim 1, further comprising:
   in response to a notification provided by the second node and in response to another lookup query to search the deduplication index for an entry that maps the fingerprint, detecting an address of the storage location by a late deduplication service;
   in response to detecting the address of the storage location, comparing the first incoming data stored in the storage location with the other incoming data by the late deduplication service; and
   performing a deduplication operation based on a result of comparing the first incoming data stored in the storage location with the other incoming data by the late deduplication service.

7. The method of claim 6 wherein the notification resides on a late deduplication list having marked storage locations for late deduplication processing by the late deduplication service; and
   wherein the late deduplication service is provided by at least one of the first node and the second node as a set of background processes.

8. Data storage equipment, comprising:
   an interface;
   storage constructed and arranged to store data; and
   nodes coupled with the interface and the storage, the nodes being constructed and arranged to perform a method of:
     in response to a lookup query to search a deduplication index for an entry that maps a fingerprint which is based on first incoming data, detecting an invalid result,
     in response to detecting the invalid result, updating the deduplication index to include an entry that maps the fingerprint, the entry initially storing an "in-progress" flag,
     performing a write operation including storing the first incoming data in a storage location, the "in-progress" flag indicating that the write operation is underway to store the first incoming data in the storage location; and
     having stored the first incoming data in the storage location, updating the deduplication index including removing the "in-progress" flag from the entry, wherein the nodes include a first node and a second node, and wherein detecting the invalid result, updating the deduplication index to include the entry that maps the fingerprint, performing the write operation including storing the first incoming data in the storage location, and updating the deduplication index including removing the "in-progress" flag from the entry, are carried out by the first node, while the second node performs an identical write operation, in parallel with the write operation being performed by the first node, to store other incoming data that is the same as the first incoming data.

9. The data storage equipment as in claim 8 wherein removing the "in-progress" flag from the entry includes:
replacing the "in-progress" flag stored in the entry with an address of the storage location.

10. The data storage equipment as in claim 9 wherein the lookup query is constructed and arranged to return one of (i) the invalid result when the deduplication index currently does not include an entry that maps the fingerprint, (ii) another address of another storage location when the deduplication index currently includes an entry that maps the fingerprint and the entry stores the other address of the other storage location, and (iii) the "in-progress" flag when the deduplication index currently includes the entry that maps the fingerprint and the entry stores the "in-progress" flag.

11. The data storage equipment as in claim 8 wherein detecting the invalid result, updating the deduplication index to include the entry that maps the fingerprint, performing the write operation including storing the first incoming data in the storage location, and updating the deduplication index including removing the "in-progress" flag from the entry, form at least part of inline deduplication processing carried out by the first node.

12. The data storage equipment as in claim 11 wherein the method further comprises:
based on the other incoming data which is processed by the second node and in response to another lookup query to search the deduplication index for an entry that maps the fingerprint, detecting the "in-progress" flag;
in response to detecting the "in-progress" flag, providing a notification to a late deduplication service by the second node, the notification directing the late deduplication service to perform late deduplication processing on the other incoming data.

13. The data storage equipment as in claim 8 wherein the method further comprises:
in response to a notification provided by the second node and in response to another lookup query to search the deduplication index for an entry that maps the fingerprint, detecting an address of the storage location by a late deduplication service;
in response to detecting the address of the storage location, comparing the first incoming data stored in the storage location with the other incoming data by the late deduplication service; and performing a deduplication operation based on a result of comparing the first incoming data stored in the storage location with the other incoming data by the late deduplication service.

14. The data storage equipment as in claim 13 wherein the notification resides on a late deduplication list having marked storage locations for late deduplication processing by the late deduplication service; and
wherein the late deduplication service is provided by at least one of the first node and the second node as a set of background processes.

15. The data storage equipment as in claim 8 wherein each of the first node and the second node is constructed and arranged to perform, on the deduplication index, lookup operations for fingerprints for new data.

16. The data storage equipment as in claim 15 wherein the lookup operations are configured to return:
(i) invalid results when fingerprints for new data are not mapped to valid addresses in the deduplication index,
(ii) "in-progress" flags when fingerprints for new data are mapped to the "in-progress" flags and inline deduplication of the new data is currently in progress, and
(iii) addresses of storage locations when fingerprints for new data are mapped to valid addresses and inline deduplication of the new data is completed.

17. A computer program product having a non-transitory computer readable medium which stores a set of instructions to coordinate deduplication; the set of instructions, when carried out by the nodes, causing the nodes to perform a method of:
in response to a lookup query to search a deduplication index for an entry that maps a fingerprint which is based on first incoming data, detecting an invalid result;
in response to detecting the invalid result, updating the deduplication index to include an entry that maps the fingerprint, the entry initially storing an "in-progress" flag;
performing a write operation including storing the first incoming data in a storage location, the "in-progress" flag indicating that the write operation is underway to store the first incoming data in the storage location; and
having stored the first incoming data in the storage location, updating the deduplication index including removing the "in-progress" flag from the entry,
wherein detecting the invalid result, updating the deduplication index to include the entry that maps the fingerprint, performing the write operation including storing the first incoming data in the storage location, and updating the deduplication index including removing the "in-progress" flag from the entry, are carried out by a first node, while a second node performs an identical write operation, in parallel with the write operation being performed by the first node, to store other incoming data that is the same as the first incoming data.

* * * * *